United States Patent
Zhao

(10) Patent No.: US 11,609,638 B2
(45) Date of Patent: Mar. 21, 2023

(54) RECOGNIZING AND TRACKING GESTURES

(71) Applicant: BOE TECHNOLOGY GROUP CO., LTD., Beijing (CN)

(72) Inventor: Jibo Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/275,543

(22) PCT Filed: Jun. 3, 2020

(86) PCT No.: PCT/CN2020/094107
§ 371 (c)(1),
(2) Date: Mar. 11, 2021

(87) PCT Pub. No.: WO2021/000686
PCT Pub. Date: Jan. 7, 2021

(65) Prior Publication Data
US 2022/0113808 A1    Apr. 14, 2022

(30) Foreign Application Priority Data
Jul. 1, 2019   (CN) .......................... 201910585800.7

(51) Int. Cl.
G06F 3/01       (2006.01)
G06T 7/50       (2017.01)
(Continued)

(52) U.S. Cl.
CPC ............ *G06F 3/017* (2013.01); *G06F 3/0484* (2013.01); *G06T 7/20* (2013.01); *G06T 7/50* (2017.01);
(Continued)

(58) Field of Classification Search
CPC ...... G06V 40/28; G06V 40/11; G06V 40/113; G06V 40/20; G06V 10/10; G06F 3/017;
(Continued)

(56) References Cited

U.S. PATENT DOCUMENTS

2013/0211843 A1*  8/2013  Clarkson ................ G06F 3/017
                                                    704/275
2013/0271397 A1* 10/2013  MacDougall ......... G06F 3/0304
                                                    345/173
(Continued)

FOREIGN PATENT DOCUMENTS

CN      102662460 A      9/2012
CN      103890695 A      6/2014
(Continued)

OTHER PUBLICATIONS

Chinese First Office Action dated Nov. 3, 2020 relating to CN Patent Application No. 201910585800.7.
International Search Report & Written Opinion relating to PCT/CN2020/094107 filed Mar. 6, 2020, dated Sep. 9, 2020.

*Primary Examiner* — Nicholas Ulrich
(74) *Attorney, Agent, or Firm* — Dinsmore & Shohl LLP

(57) ABSTRACT

A gesture control method comprises: acquiring an image; performing a gesture detection on the image to recognize a gesture from the image; determining, if no gesture is recognized from the image, whether a time interval from a last gesture detection, in which a gesture was recognized, to the gesture detection is less than a preset time period; tracking, if the time interval is less than the preset time period, the gesture in the image based on a comparative gesture which is a gesture recognized last time or tracked last time; and updating the comparative gesture with a currently recognized gesture or a currently tracked gesture. A gesture control method is provided that comprises: identifying an image acquisition device for acquiring image, to determine (Continued)

whether the image acquisition device is a depth-of-field image acquisition device, and performing gesture control based on the identification.

16 Claims, 10 Drawing Sheets

(51) Int. Cl.
*G06F 3/0484* (2022.01)
*G06T 7/20* (2017.01)
*G06V 40/20* (2022.01)

(52) U.S. Cl.
CPC .............. *G06V 40/20* (2022.01); *G06V 40/28* (2022.01); *G06F 2203/04806* (2013.01); *G06T 2207/30241* (2013.01)

(58) Field of Classification Search
CPC .................. G06F 3/011; G06F 3/0484; G06F 2203/04806; G06F 3/005; G06T 7/20; G06T 7/50; G06T 2207/30241
See application file for complete search history.

(56) References Cited

U.S. PATENT DOCUMENTS

| | | | |
|---|---|---|---|
| 2013/0328766 A1* | 12/2013 | Igarashi | G06F 3/04883 345/156 |
| 2014/0157210 A1 | 6/2014 | Katz et al. | |
| 2014/0191998 A1* | 7/2014 | Chuang | G06F 3/017 345/173 |
| 2014/0211992 A1 | 7/2014 | Stoppa et al. | |
| 2015/0268789 A1* | 9/2015 | Liao | G06F 3/0488 345/173 |
| 2017/0097978 A1 | 4/2017 | Gupta et al. | |
| 2017/0178352 A1* | 6/2017 | Harmsen | G06V 10/42 |
| 2020/0057886 A1 | 2/2020 | Zhao | |
| 2020/0225759 A1 | 7/2020 | Yan et al. | |

FOREIGN PATENT DOCUMENTS

| | | |
|---|---|---|
| CN | 108256504 A | 7/2018 |
| CN | 109145803 A | 1/2019 |
| CN | 109492577 A | 3/2019 |
| CN | 109753157 A | 5/2019 |
| CN | 110297545 A | 10/2019 |
| WO | 2018148951 A1 | 8/2018 |

* cited by examiner

RECOGNIZING AND TRACKING GESTURES

CROSS REFERENCES TO RELATED APPLICATIONS

This application is a national phase entry under 35 U.S.C. § 371 of International Patent Application No. PCT/CN2020/094107 filed on Jun. 3, 2020, which claims the priority of Chinese Patent Application No. 201910585800.7 filed on Jul. 1, 2019, the entire content of which is incorporated herein by reference.

TECHNICAL FIELD

The present disclosure relates to a gesture control method, a gesture control device, a gesture control system, and a computer-readable storage medium.

BACKGROUND

At present, there are more and more ways of human-computer interaction, among which the gesture control function based on the vision principle has attracted more and more attention because it has great advantages in hardware cost and operation mode. Gesture recognition functions can be incorporated into electronic devices such as television sets, electronic photo frames, and screens to achieve gesture-based human-computer interaction.

SUMMARY

According to one aspect of the present disclosure, there is provided a gesture control method, comprising: acquiring an image; performing a gesture detection on the image to recognize a gesture from the image; determining, if no gesture is recognized from the image, whether a time interval from a last gesture detection, in which a gesture was recognized, to the gesture detection is less than a preset time period; tracking, if the time interval is less than the preset time period, the gesture in the image based on a comparative gesture which is a gesture recognized last time or tracked last time; and updating the comparative gesture with a currently recognized gesture or a currently tracked gesture.

According to some exemplary embodiments, the gesture control method further comprises: generating a gesture instruction based on a result of the gesture detection, wherein the result of the gesture detection includes a form of the gesture and trajectory information of the gesture.

According to some exemplary embodiments, the preset time period is selected from a range from 0.5 seconds to 1 second.

According to some exemplary embodiments, performing the gesture detection on the image comprises: performing a motion detection on the image to determine a focus area in the image; performing the gesture detection based on the focus area. The gesture control method further comprises: if the gesture is currently recognized, updating the comparative gesture based on the currently recognized gesture; updating the focus area and reacquiring an image; and performing a gesture detection on the reacquired image based on the updated focus area.

According to some exemplary embodiments, updating the focus area comprises: updating the focus area based on the currently recognized gesture or based on the currently tracked gesture.

According to some exemplary embodiments, acquiring an image comprises: acquiring a depth image corresponding to the image; performing a gesture detection on the image comprises: determining a foreground connected component of the image based on the depth image; determining a detection area in the image based on the foreground connected component; and performing the gesture detection based on the detection area. The gesture control method further comprises: where the gesture is currently recognized, updating the comparative gesture based on the currently recognized gesture.

According to some exemplary embodiments, the recognized gesture comprises a one-hand gesture or a two-hand gesture, the gesture control method further comprises, in a case where the recognized gesture is a two-hand gesture: stopping the determining of the gesture detection frame; and stopping the updating of the comparative gesture; wherein the time interval is a time interval from the last detection in which a one-hand gesture was recognized to the gesture detection.

According to another aspect of the present disclosure, there is provided a gesture control method comprising: identifying an image acquisition device for acquiring image, to determine whether the image acquisition device is a depth-of-field image acquisition device; and conducting a corresponding gesture control method based on the result of the identifying.

According to some exemplary embodiments, the gesture control method further comprises: if the image acquisition device is not a depth-of-field image acquisition device, the gesture control method is used to control operation of a media resource display device to implement at least one of the following gesture instructions: in the case where it is detected that an movement distance of an one-hand gesture in a first form along a first direction is greater than a preset distance, generating a page-turning-in-a-first-direction gesture instruction; in the case where it is detected that a one-hand gesture in the first form moves in any direction, generating a moving-in-a-corresponding-direction gesture instruction which is adaptable to control a first identifier in an display interface of the media resource display device to move in the corresponding direction; and in the case where it is detected that an one-hand gesture changes from a second form to a third form which is different from the second form, generating a click operation instruction.

According to some exemplary embodiments, the gesture control method further comprises: if the image acquisition device is a depth-of-field image acquisition device, the gesture control method is used to control operation of an media resource display device to implement at least one of the following gesture instructions: in the case where it is detected that an movement distance of a one-hand gesture in a first form along a first direction is greater than a preset distance, generating a page-turning-in-a-first-direction gesture instruction; in the case where it is detected that gestures of both hands are in a second form, generating a display-zoom-in gesture instruction for zooming in a content displayed on a display interface of the media resource display device; in the case where it is detected that gestures of both hands are in a third form that is different from the second form, generating a display-zoom-out gesture instruction for zooming out a content displayed on the display interface of the media resource display device; in the case where a content displayed on the display interface of the media resource display device is already in a zoomed-in manner, if it is detected that a one-hand gesture in the third form moves in any direction, generating a drag-after-zoom-in-in-a-corresponding-direction gesture instruction for controlling a zoomed-in content on the display interface of the media resource display device to be moved in the corresponding direction.

According to some exemplary embodiments, the gesture control method further comprises: displaying result information of the gesture detection on the display interface of the media resource display device.

According to some exemplary embodiments, the result information of the display gesture detection comprises at least one of the following: when a gesture is recognized, displaying a second identifier on the display interface; and when a gesture movement is recognized, moving the second identifier along a direction of the gesture movement.

According to a further aspect of the present disclosure, there is provided a gesture control device, comprising: a processor; and a memory for storing computer-executable instructions which when executed by the processor cause the processor to: acquire an image; perform a gesture detection on the image to recognize a gesture from the image; determine, if no gesture is recognized from the image, whether a time interval from a last gesture detection, in which a gesture was recognized, to the gesture detection is less than a preset time period; track, if the time interval is less than the preset time period, the gesture in the image based on a comparative gesture which is a gesture recognized last time or tracked last time; and update the comparative gesture with a currently recognized gesture or a currently tracked gesture.

According to some exemplary embodiments, the computer-executable instructions when executed by the processor further cause the processor to: identify an image acquisition device for acquiring image, to determine whether the image acquisition device is a depth-of-field image acquisition device, wherein acquiring the image comprises: instructing the image acquisition device to perform image acquisition on a target, and acquiring the obtained image from the image acquisition device, performing gesture detection on the image comprises: performing gesture detection on the image based on type of the image acquisition device; and updating the comparative gesture with the currently recognized gesture or the currently tracked gesture comprises: in the case where a gesture is currently recognized, determining a gesture detection frame based on the currently recognized gesture, and updating the comparative gesture with a content in the gesture detection frame; and in the case where the gesture is currently tracked, updating the comparative gesture with the currently tracked gesture.

According to a still further aspect of the present disclosure, there is provided a computer-readable storage medium that stores executable instructions therein, wherein when the executable instructions are executed by a processor, the processor is caused to perform the gesture control methods as above.

BRIEF DESCRIPTION OF THE DRAWINGS

For clearly understanding the problems to be solved by the present disclosure, the above and other objectives, features, and advantages, hereinafter, the exemplary embodiments of the present disclosure will be described in detail with reference to the accompanying drawings, in which.

Figure 1:
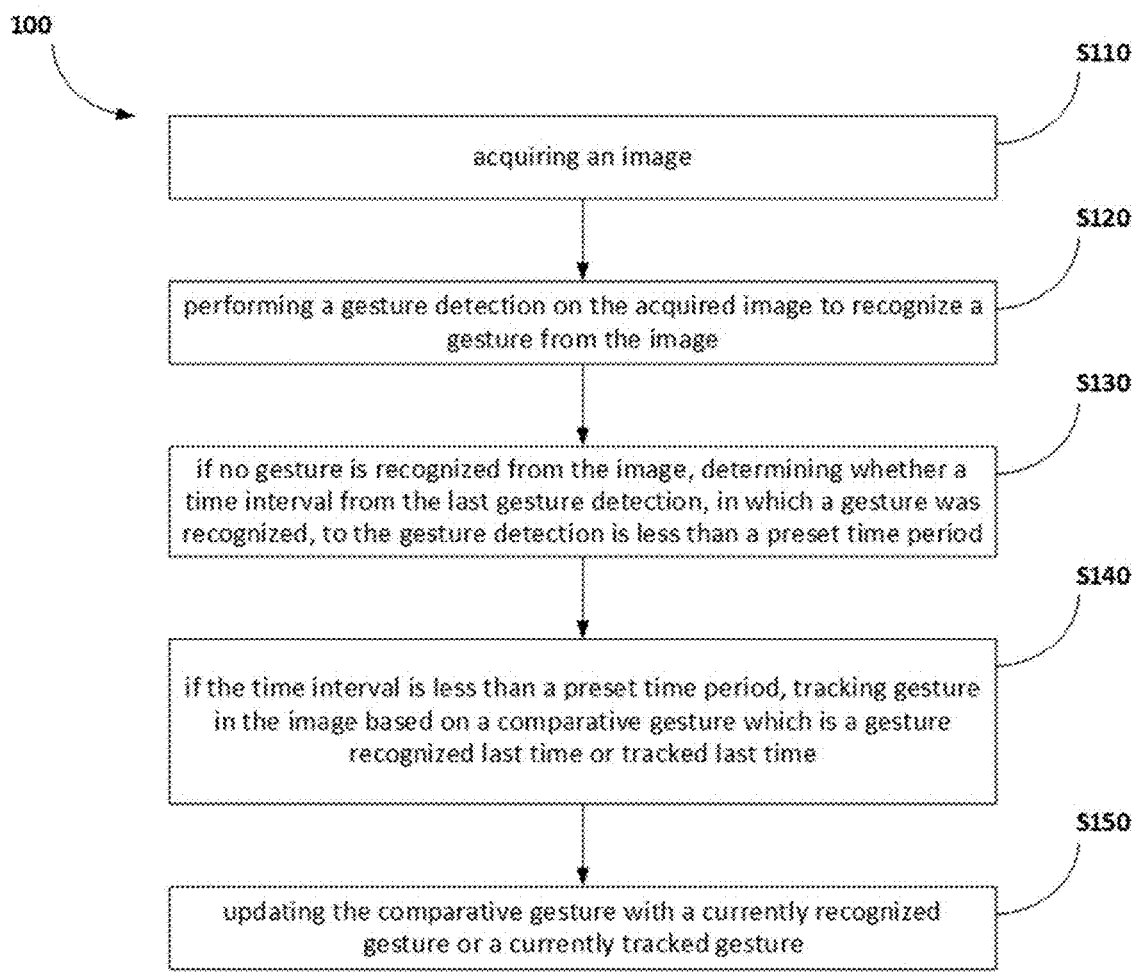
FIG. 1 is a schematic flowchart of a gesture control method according to an exemplary embodiment of the present disclosure.

Throughout the drawings, the same or similar reference signs indicate the same or similar components, elements, or parts. In addition, the accompanying drawings are only used for exemplary description of the present disclosure, thus they are drawn to merely illustrate the contents related to the present disclosure, and not in all the details nor to scale.

DETAILED DESCRIPTION OF ILLUSTRATIVE EMBODIMENTS

The gesture control methods, the gesture control systems, and the electronic devices according to the exemplary embodiments of the present disclosure will be described in detail below in conjunction with the accompanying drawings.

It will be understood that although the terms "first", "second", "third", etc. may be used herein to describe various elements, components, and/or parts, these elements, components, and/or portions should not be limited by these terms. These terms are only used to distinguish one element, component or part from another element, component or part. Therefore, the first element, component or part discussed below may also be referred to as the second or third element, component or part without departing from the teachings of the present disclosure.

The terms used herein are only used for the purpose of describing specific embodiments and are not intended to limit the present invention. As used herein, the singular forms "a," "an," and "the" are intended to also include the plural, unless the context clearly indicates otherwise. It should also be understood that the terms "including", "comprising", and/or variants thereof when used in this specification refer to the existence of the stated features, wholes, steps, operations, elements and/or components, but do not exclude the existence of one or more other features, wholes, steps, operations, elements, components, and/or groups thereof or the addition of one or more other features, wholes, steps, operations, elements, components, and/or groups thereof. In addition, the term "and/or" as used herein includes any and all combinations of one or more of the associated items.

It is to be understood that the steps in the methods described herein are all exemplary, and they do not necessarily have to be executed in the order listed, rather one or more of the steps may be conducted in a different sequence or at the same time according to practical conditions. In addition, the methods described herein may also include other additional steps if needed.

It should be noted that, in the description of this specification, descriptions with references to the expressions "one embodiment", "some embodiments", "exemplary embodiments", "specific example", or "some examples", etc., means that the specific feature, structure, material, or characteristic described in combination with the embodiment(s) or example(s) is included in at least one embodiment or example of the present disclosure. Therefore, in this document, the schematic descriptions in connection with the above expressions are not necessarily for the same embodiment or example only. Rather, the specific features, structures, materials, or characteristics described may be combined in any of one or more embodiments or examples in a suitable manner. In addition, those skilled in the art can readily combine or engage the different embodiments or examples or the features/elements of the different embodiments or examples described in this specification without contradicting each other.

For the purpose of clear description, certain technologies, structures, or materials well-known in the art to which the present invention belongs have not been described in detail, so as to avoid making this application redundant.

In the gesture detection process of the conventional gesture control methods and devices, when gesture fails to be detected from certain image frame(s) due to angles, light, etc., generally the method returns to the initialization state, re-acquire image and perform detection again, which may adversely affect user experience.

It is also expected that gesture control methods and devices can recognize the type of image acquisition device such as a camera, so as to be able to adapt to a variety of external image acquisition devices, and to implement a variety of gesture instructions.

Referring to FIG. 1, it shows a first gesture control method 100 according to an exemplary embodiment of the present disclosure. The first gesture control method 100 shown in FIG. 1 includes the following steps:

S110: acquiring an image;

S120: performing a gesture detection on the acquired image to recognize a gesture from the image;

S130: if no gesture is recognized from the image, determining whether a time interval from the last gesture detection, in which a gesture was recognized, to the gesture detection is less than a preset time period;

S140: if the time interval is less than the preset time period, tracking the gesture in the image based on a comparative gesture which is a gesture recognized last time or tracked last time;

S150: updating the comparative gesture with a currently recognized gesture or a currently tracked gesture.

As mentioned above, one of the problems to be addressed by the gesture control method according to the present disclosure is that in the gesture detection process, gestures fails to be detected from the detection area of certain image frames due to angle, light, etc. This problem can be solved by the gesture control method including the above steps. In addition, it should be understood that the gesture control method according to the present disclosure may include any other steps as appropriate according to actual needs, for example, performing, when the gesture is recognized, corresponding operations based on the recognized gesture, which will be described in detail below.

In the above step S110 of the first gesture control method 100, an instruction is issued to instruct a corresponding image acquisition device to perform image acquisition on a target, and an image can be acquired from the image acquisition device. The image acquisition device may be any suitable known image acquisition device, such as, but not limited to, a common web camera, a depth-of-field camera, a digital camera device, and so on. In step S120, any known suitable method can be used to perform gesture detection on the image, and there is no particular limitation on the method for gesture detection. In step 130, the preset time period can be any suitable time period, which can be set according to actual needs. In some exemplary embodiments of the present disclosure, the preset time period may be selected from a range of 0.5 seconds to 1 second; and in other exemplary embodiments of the present disclosure, the preset time period is set to 1 second. In step S140, any suitable tracking algorithm can be used to track gesture in the image, and there is no particular limitation on the tracking algorithm. In some exemplary embodiments of the present disclosure, the tracking may be performed with use of the MEDIANFLOW tracking algorithm which has better comprehensive performance. In addition, the comparative gesture used for gesture tracking is a pre-stored gesture pattern, which can be a gesture recognized last time or a gesture tracked last time, for comparison in the tracking process. In step S150, the currently tracked gesture may be a feature part of the frame of image, which has the highest matching degree with the comparative gesture. Of course, the currently tracked gesture can also be determined based on the comparative gesture based on any other known suitable criteria. After step S150 in the first gesture control method 100, the frame of image can be updated and the detection can be again performed on the updated frame of image. If a gesture is recognized in the next frame of image, then the comparative gesture will be updated based on the recognized gesture. If the gesture is not recognized in the next frame of image, step S130 is executed again to determine whether the time interval from the last gesture detection, in which the gesture is recognized last time, to current gesture detection is less than the preset time period, and if it is less than the preset time period, the above steps S140 and S150 are executed again.

Figure 2:
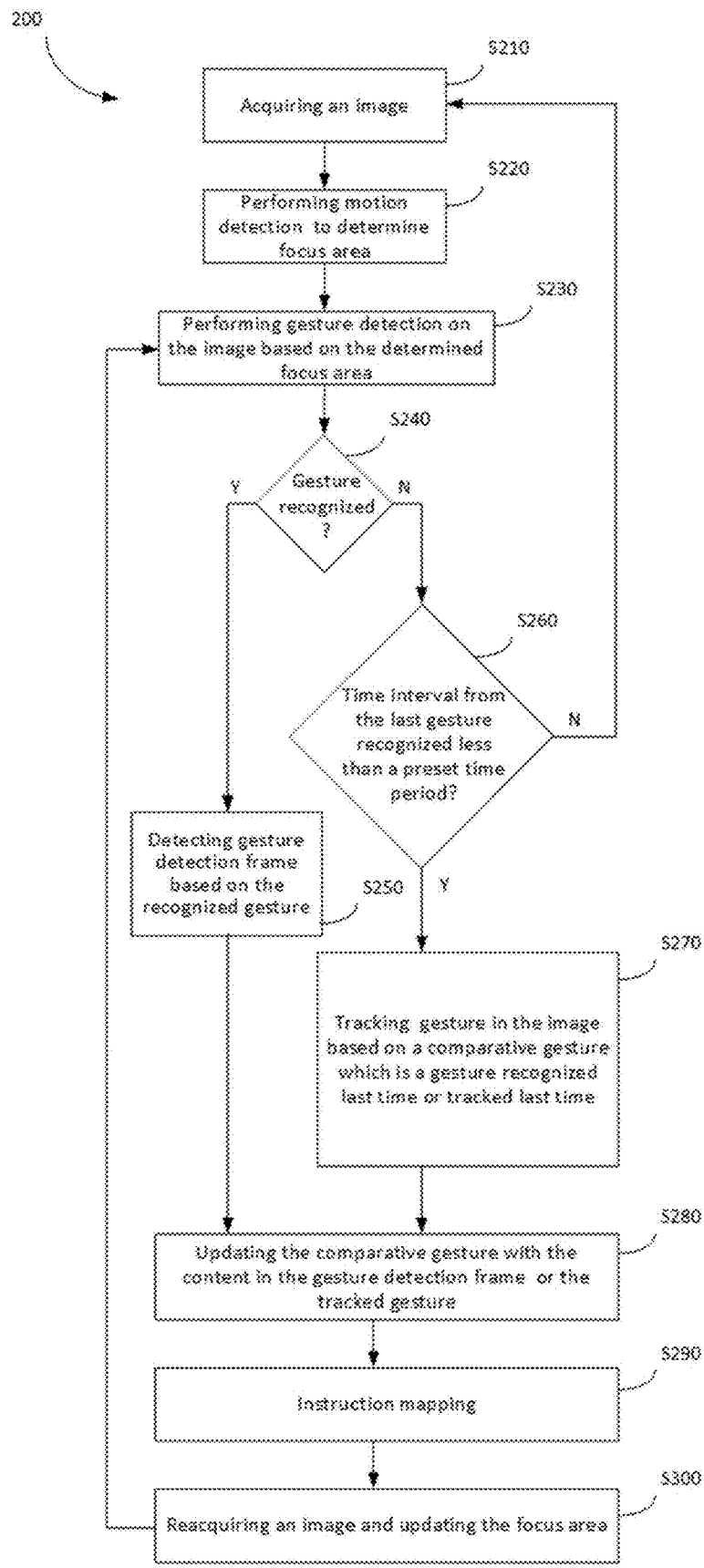
FIG. 2 is a schematic flowchart of a gesture control method according to an exemplary embodiment of the present disclosure.

Refer to FIG. 2, FIG. 2 shows a second gesture control method 200 according to an exemplary embodiment of the present disclosure. The second gesture control method 200 starts at step S210. In step S210 of the second gesture control method 200, the image acquisition device can be instructed to acquire a frame of image for the target to be recognized, and acquires the acquired image from the image acquisition device. Similarly, the image acquisition device may be any suitable image acquisition device, such as a common web camera, etc., to which there is no particular limitation.

Figure 3:
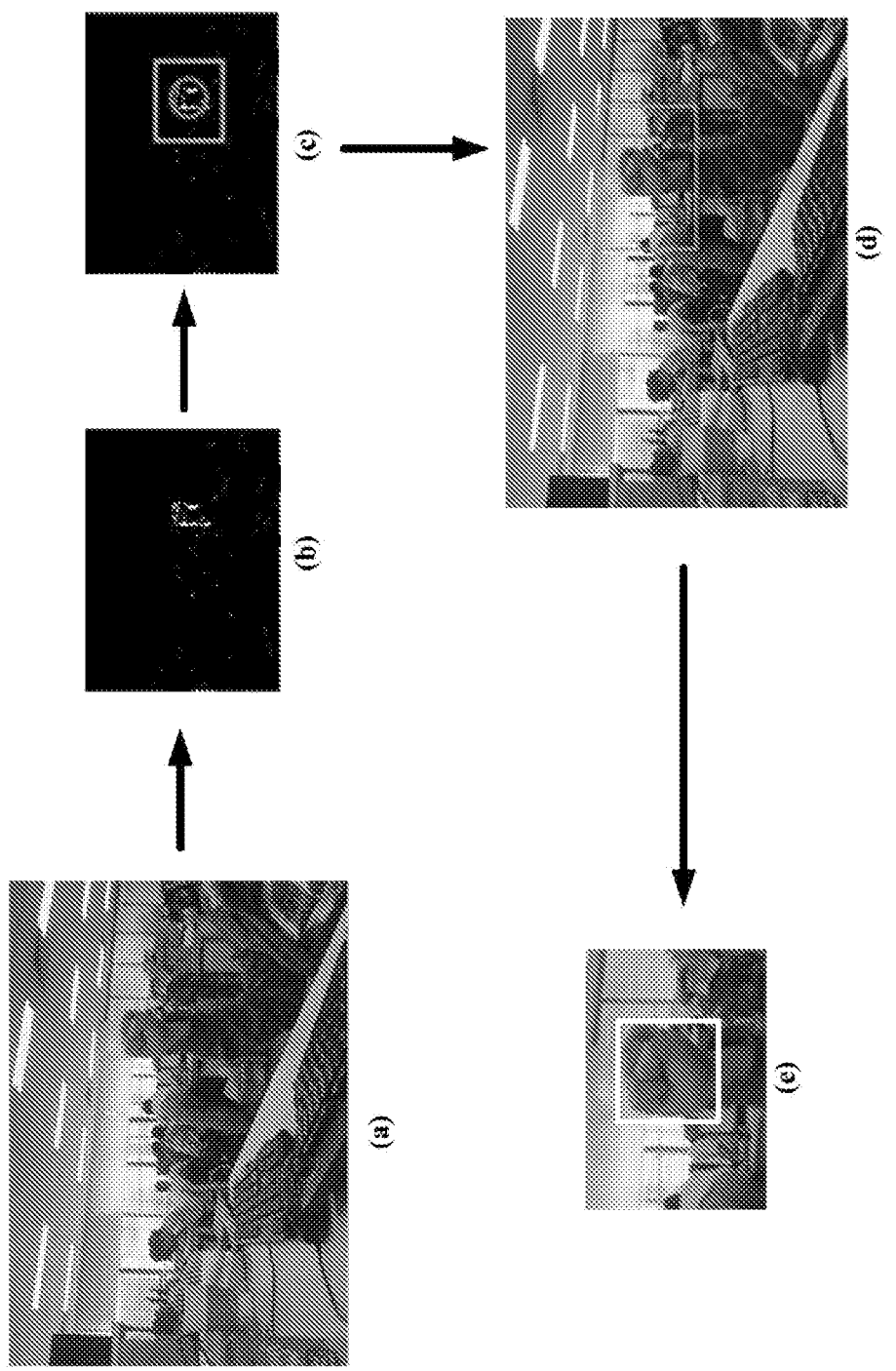
FIG. 3 schematically shows how to determine the focus area in an image in the gesture control method shown in FIG. 2.

In step S220 of the second gesture control method 200, a motion detection is performed on the acquired image to determine a focus area. In step S230 of the second gesture control method 200, a gesture detection is performed on the image based on the determined focus area. Turning now to FIG. 3, it schematically shows how to determine a focus area in a frame of image and then detect a gesture in the image based on the determined focus area. The view (a) in FIG. 3 is a frame of an original image collected by the image acquisition device. After the original image is zoomed and background modeled, a background image corresponding to the original image can be obtained as shown in view (b). It should be understood that the zooming process can be performed with interpolation algorithms, such as but not limited to, Lagrangian interpolation, nearest neighbor interpolation, Gaussian interpolation, bilinear interpolation, quadratic interpolation, cubic interpolation, Newton interpolation, etc.; and the background modeling can be performed with, such as but not limited to, inter-frame difference method, Gaussian modeling method, approximate median filter, Kalman filter, background modeling method based on color information, and kernel density estimation method, etc. In the present disclosure, there is no special limitation on either the zooming process or the background modeling. In the corresponding background image shown in view (b) of FIG. 3, the white part represents a motion area where motion occurs, and the black part represents the area where no motion occurs. Motion detection is performed on the background image shown in view (b) of FIG. 3 to determine a motion area, such as the area defined by the circle in view (c) of FIG. 3; and the detection are can be determined based on the determined motion area, such as the area defined by the rectangular box in view (c) of FIG. 3. The detection area determined in the background image of the view (c) of FIG. 3 can be mapped to the original image, to thereby obtain a focus area in the frame the original image, such as the area defined by the rectangular box in the view (d) of FIG. 3. Subsequently, gesture detection can be performed on the original image of the frame based on the focus area for the frame of the original image as shown in the view (d) of FIG. 3, so as to obtain, for example, a recognized gesture as shown in the view (e) of FIG. 3. It should be understood that the implement shown in FIG. 3 is merely exemplary and illustrative, and is not intended for limiting the scope of the inventions. In steps S220 and S230 of the second gesture control method 200, any known method may be used according to actual needs to perform motion detection on the image to determine the focus area and gesture detection on the image based on the focus area.

Turning to FIG. 2, in step S240 of the second gesture control method 200, it is determined whether a gesture is recognized. If a gesture is recognized, step S250 is performed that a gesture detection frame is determined based on the recognized gesture, such as, the rectangular frame circumscribing the recognized gesture as shown in view (e) of FIG. 3. If no gesture is recognized, step S260 is executed to determine whether the time interval from the last detection in which the gesture was recognized last time to the current detection is less than a preset time period. If the time interval is not less than the preset time period, method returns to the step S210, which is in an initial-state, to re-acquire a frame of image, and re-execute motion detection and determine the focus area thereon. If the time interval is less than the preset time period, step S270 is executed to track gesture in the image based on the comparative gesture.

After steps S250 and S270 in the second gesture control method 200, the following steps are performed: step S280, updating the comparative gesture with the content in the gesture detection frame determined this time or the tracked gesture which is tracked this time; step S290, performing instruction mapping based on the recognized or tracked gesture; and step S300, reacquiring a frame of image, and determining a focus area in the reacquired image based on the current focus area. Subsequently, the second gesture control method 200 returns to step S230 to perform gesture detection on the newly acquired frame of image based on the updated focus area, and repeat steps S240 to S300. It should be understood that, in the present disclosure, it is only an exemplary example to determine the gesture detection frame based on the recognized gesture, and update the comparative gesture with use of the content in the gesture detection frame determined this time to, which is not limiting the scopes of the inventions. Those skilled in the art can readily use any other suitable method to update the comparative gesture based on the recognized gesture according to actual needs.

According to the second gesture control method 200, when certain frames are lost due to angles, light, etc. during the gesture detection process, it can avoid immediately returning to the initial state and restarting the motion detection, instead the gesture is tracked in the image based on the previously set comparative gesture under the preset conditions (for example, when the time interval between the last detection in which a gesture is detected and current detection is less than a preset time period), which greatly improves the user experience.

Figure 4:
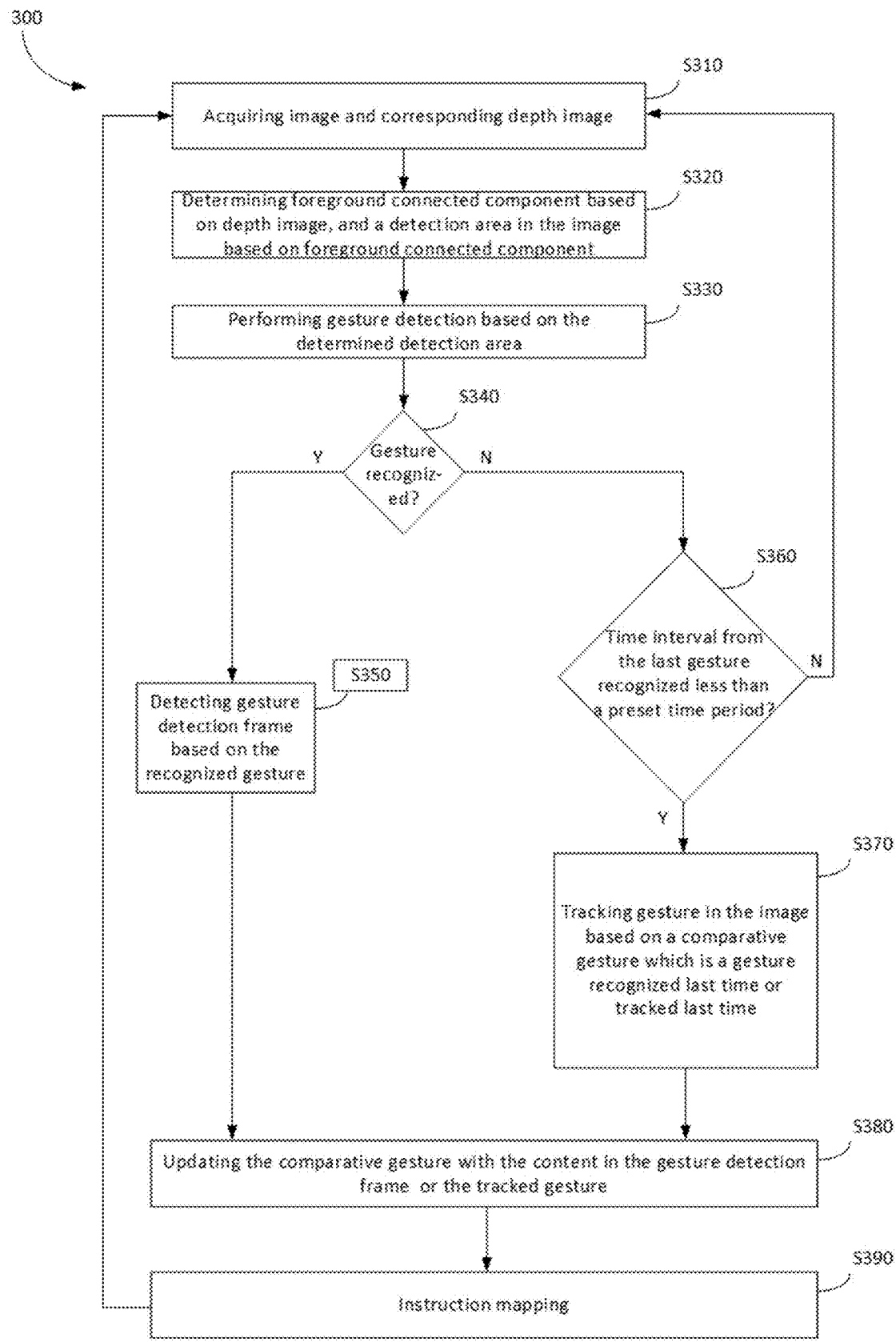
FIG. 4 is a schematic flowchart of a gesture control method according to an exemplary embodiment of the present disclosure.

Referring now to FIG. 4, it shows a third gesture control method 300 according to an exemplary embodiment of the present disclosure. The third gesture control method 300 starts from step S310. In step S310 of the third gesture control method 300, a depth-of-field image acquisition device is instructed to acquire a frame of image and a corresponding depth image for a target to be recognized, and the acquired image and the corresponding depth information are acquired from the depth-of-field image acquisition device. The depth-of-field image acquisition device may be any suitable image acquisition device with a depth-of-field function, such as a depth-of-field camera, etc., to which there is no particular limitation. The depth image reflects the distance of each pixel in the collected image from the depth-of-field image acquisition device.

Figure 5:
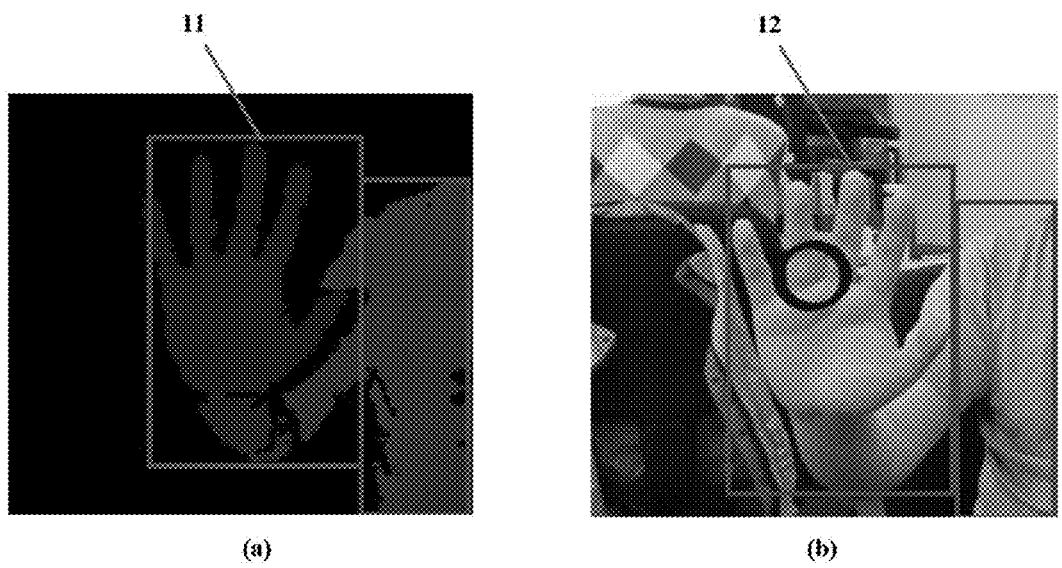
FIG. 5 schematically shows determining the foreground connected component and determining a corresponding gesture detection area in the image based on the foreground connected component in the gesture control method shown in FIG. 4.

In step S320 of the third gesture control method 300, a foreground connected component of the collected image is determined based on the depth image, and a detection area in the image is determined based on the foreground connected component. In step S330 of the third gesture control method 300, gesture detection is performed based on the determined detection area. Turning now to FIG. 5, the view (a) thereof is a depth image for the collected image, which reflects the distance of each pixel in the collected image from the depth-of-field image capturing device. For example, those pixels of the view (a) which are adjacent to each and the differences of the depth values of which are within a certain range, for example, within 50 mm, can be classified into a same connected component, thus, connected component(s) in the image can be generated. In addition, it is to be readily understand that when the user raises his/her hand for operation, the distance between the palm of the hand and the depth-of-field image acquisition device could be the shortest, so the connected component(s) in the foreground (such as, the area defined by the box 11 in the view (a) in FIG. 5) can be mapped to the collected image as a detection area, for example, the area defined by the box 12 in the view (b) of FIG. 5, so as to be used for gesture detection. It should be understood that the connected components can be obtained with any known suitable algorithm, such as, but not limited to, an algorithm based on stroke identification, an algorithm based on contour marking, a Two-Pass algorithm or a Seed-Filling method, etc. The present disclosure shall not be limited thereto, and those skilled in the art can select a suitable algorithm according to actual needs.

Continuing to refer to FIG. 4, in the third gesture control method 300 it is determined in step S340 whether a gesture is recognized. If a gesture is recognized, step S350 is executed to determine a gesture detection frame based on the recognized gesture, for example but not limited to, a rectangular frame circumscribing the recognized gesture. If gesture is not recognized, step S360 is executed to determine whether the time interval from the last time detection in which the gesture was recognized to the current detection is less than a preset time period. If the time interval is not less than the preset time period, method returns to the initial step S310, reacquire a frame of image and obtain a corresponding depth image thereof, and then re-determine the foreground connected component and detect the gesture. If the time interval is less than the preset time period, step S370 is executed to track the gesture in the image based on the comparative gesture.

After steps S350 and S370, the third gesture control method 300 continues with the following steps: step S380, updating the comparative gesture with the content in the gesture detection frame which is determined this time or the tracked gesture which is tracked this time; step S390, performing instruction mapping based on the recognized or tracked gesture. Subsequently, the third gesture control method 300 returns to step S310, to reacquire a frame of image and obtains a corresponding depth image thereof, and repeats steps S320 to S390.

Figure 6:
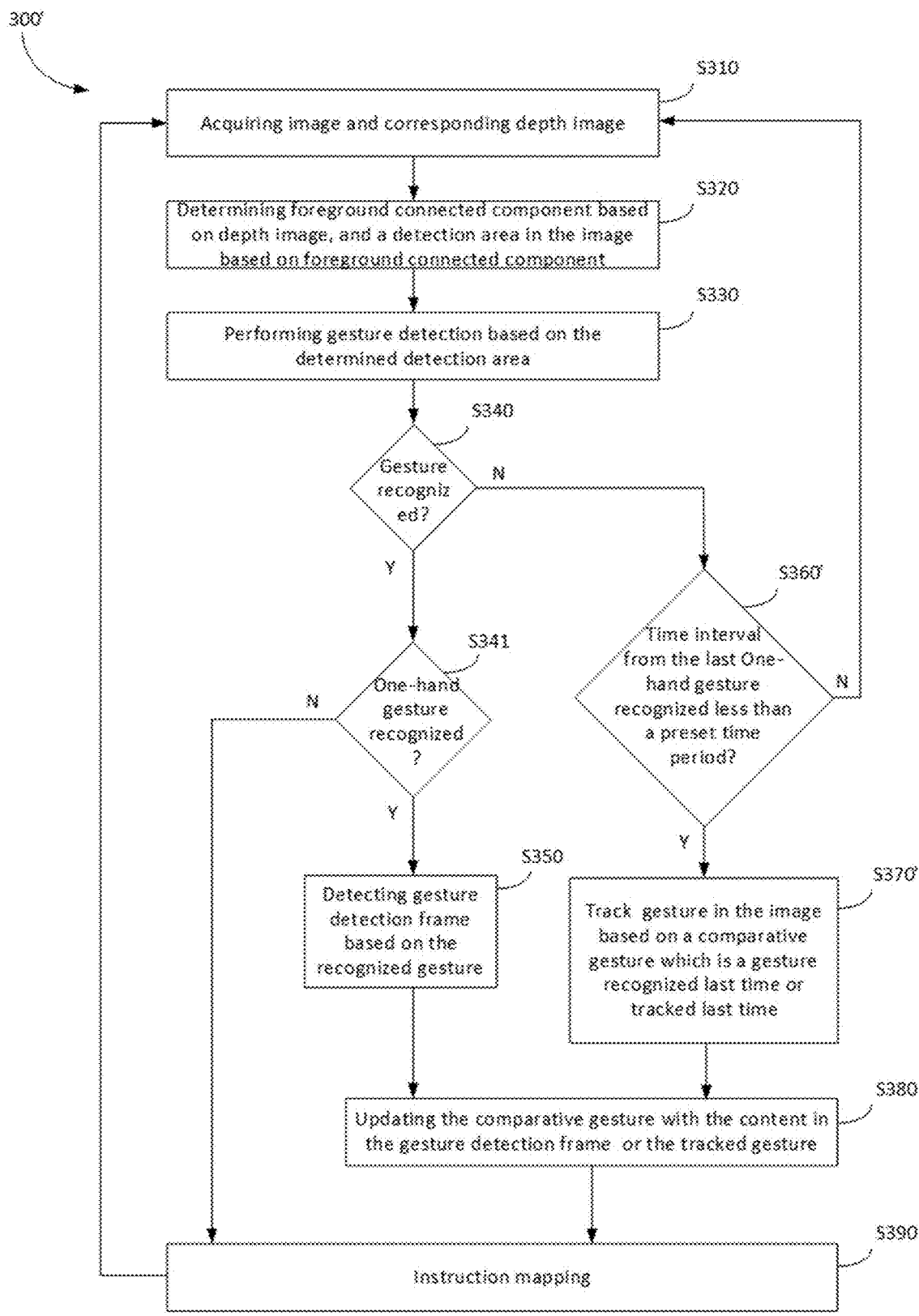
FIG. 6 is a schematic flowchart of a gesture control method according to an exemplary embodiment of the present disclosure.

Refer to FIG. 6, it shows a fourth gesture control method 300' according to an exemplary embodiment of the present disclosure. The fourth gesture control method 300' is basically the same as the third gesture control method 300 shown in FIG. 4, except that there are differences in steps S341, S360', and S370'. Therefore, only these differences of the fourth gesture control method 300' will be discussed below.

In the fourth gesture control method 300' when a gesture is recognized, it will determine in step S341 whether the recognized gesture is a one-hand gesture, and if it is a one-hand gesture, then the method continues to the previously described step S350; and if it is not a one-hand gesture, the method proceeds directly to step S390 to perform instruction mapping, and the gesture detection frame is no longer determined, and the comparative gesture is no longer updated. In addition, in the fourth gesture control method 300' when gesture is not recognized, it will determine in step S360' whether the time interval from the last detection, in which a one-hand gesture is recognized, to the current detection is less than a preset time period; and if the time interval is less than the preset time period, step S370' is executed to track the gesture in the image based on the comparative gesture, wherein the comparative gesture is the one-hand gesture recognized last time or the one-hand gesture tracked last time. It can be seen that the fourth gesture control method 300' performs different processing on the one-hand gesture and the two-hand gesture among the recognized gestures, and in this embodiment the recognized two-hand gesture does not need to be tracked.

According to the third and fourth gesture control methods 300 and 300', the tracking algorithms are optimized based on the information of the foreground image. That is, after the foreground is extracted through the depth image, a detection area is divided out from the same area of the corresponding image, and if the gesture detection on this area does not detect human hand, it will still track this frame in combination with the detected features of the target from the previous frame.

It should also be noted here that in the second, third, and fourth gesture control methods 200, 300, and 300', the preset time period can be any suitable time period, which can be set according to actual needs. Similarly, in some exemplary embodiments of the present disclosure, the preset time period may be selected from a range from 0.5 seconds to 1 second, and in other exemplary embodiments of the present disclosure, the preset time period is set to 1 second. Similarly, in the second, third, and fourth gesture control methods 200, 300, 300', any suitable tracking algorithm can be used to track gesture in the image. In some exemplary embodiments of the present disclosure, the tracking may be performed with the MEDIANFLOW tracking algorithm which has better comprehensive performance.

Figure 7:
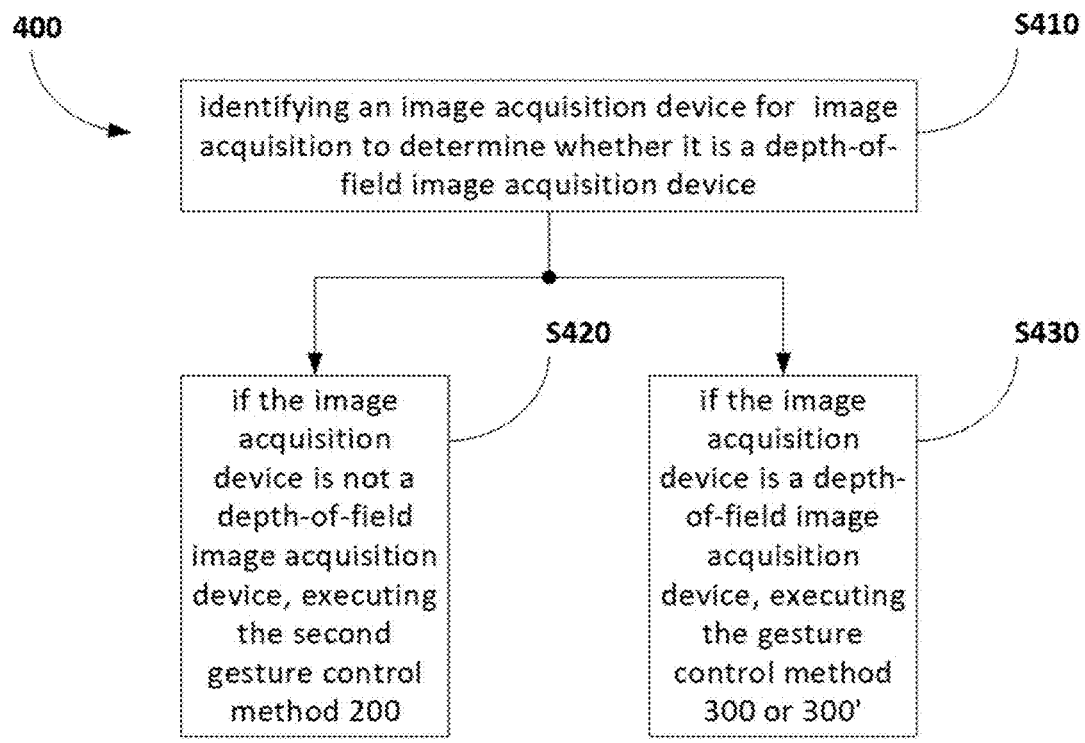
FIG. 7 is a schematic flowchart of a gesture control method according to an exemplary embodiment of the present disclosure.

Refer to FIG. 7, it shows a fifth gesture control method 400 according to an exemplary embodiment of the present disclosure. The fifth gesture control method 400 includes the following steps:

S410: identifying an image acquisition device used to acquire an image to determine whether it is a depth-of-field image acquisition device;

S420: if it is recognized that the image acquisition device is not a depth-of-field image acquisition device, executing the second gesture control method 200; and S430: if the image acquisition device is a depth-of-field image acquisition device, executing the third gesture control method 300 or the fourth gesture control method 300'.

Therefore, in the fifth gesture control method 400, a step of identifying whether the image acquisition device is a depth-of-field image acquisition device is added, so that when an image acquisition device is connected externally, different types of image acquisition devices can be adapted and corresponding operations can be performed. After the image acquisition device has been recognized, the fifth gesture control method 400 can correspondingly execute the second, third, or fourth gesture control method 200, 300, or 300' based on the recognition result.

According to the aforementioned gesture control methods, when gesture fails to be detected from certain image frames in the gesture detection and recognition process s due to angles, light, etc., immediate returning to the initialization state can be avoided by tracking the gesture, and the aforementioned gesture control methods also can optimize the tracking algorithms; thus user experience can be greatly improved.

Figure 8:
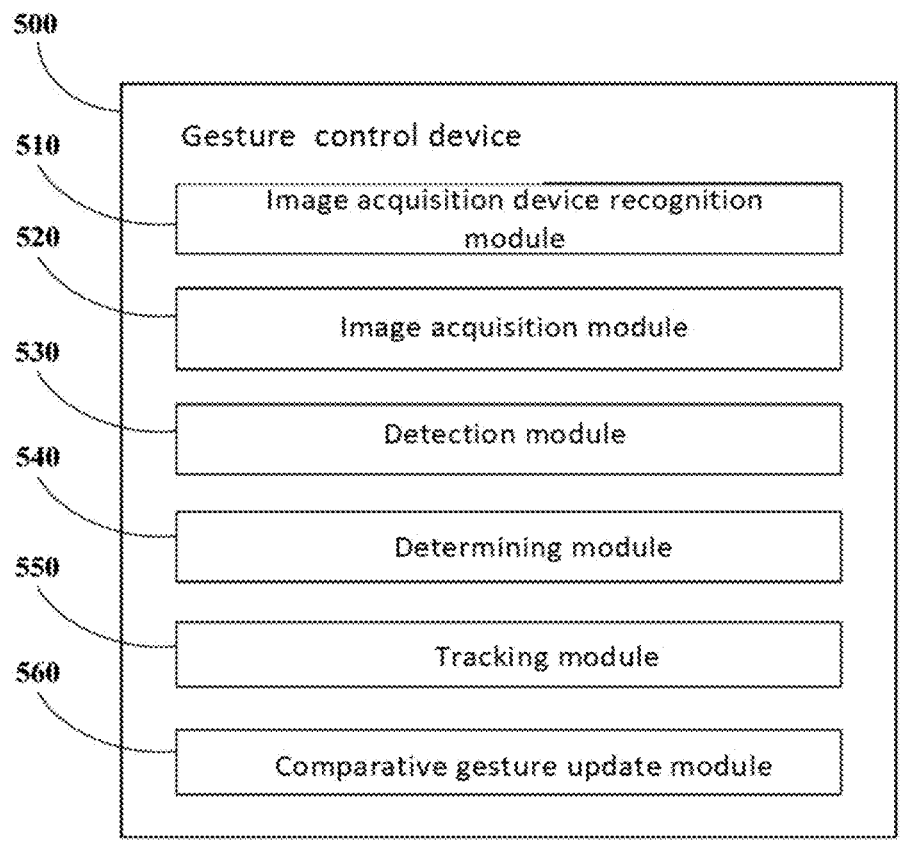
FIG. 8 is a schematic structural block diagram of a gesture control device according to an exemplary embodiment of the present disclosure.

Referring now to FIG. 8, it shows a schematic structural block diagram of a gesture control device 500 according to an exemplary embodiment of the present disclosure. The gesture control device 500 includes: an image acquisition device recognition module 510, an image acquisition module 520, a detection module 530, a determining module 540, a tracking module 550, and a comparative gesture update module 560. The image acquisition device recognition module 510 is configured to identify the image acquisition device for acquiring image, to determine whether the image acquisition device is a depth image acquisition device. The image acquisition module 520 is configured to acquire an image; for example, the image acquisition module 520 may be configured to command the image acquisition device to perform image acquisition on a target, and to acquire the acquired image from the image acquisition device. When the image acquisition device is a depth image acquisition device, the image acquisition module 520 also acquires a depth image corresponding to the acquired image. The detection module 530 is configured to perform gesture detection on the image to recognize gesture(s) in the image; for example, the detection module 530 may be configured to perform gesture detection on the image based on the type of the image acquisition device. The determining module 540 is configured to determine whether the time interval from the last detection in which a gesture was recognized last time to the current detection is less than a preset time period in the case where the gesture is not recognized in the image. The tracking module 550 is configured to: in the case where the time interval is less than the preset time period, track gesture in the image based on the comparative gesture, the comparative gesture being the last recognized gesture or the last tracked gesture. The comparative gesture update module 560 is configured to update the comparative gesture with use of the recognized gesture or the tracked gesture; for example, the comparative gesture update module 560 may be configured to: in the case where a gesture is currently recognized, determine a gesture detection frame based on the currently recognized gesture, and update the comparative gesture with use of the content in the gesture detection frame; and, in the case where a gesture is currently tracked, update the comparative gesture with use of the currently tracked gesture.

In addition, the gesture control device 500 may also include a system bus or other data and command transmission systems to connect the aforementioned modules to each other. The system bus may include any of or a combination of various bus structures, such as a memory bus or memory controller, a peripheral bus, a universal serial bus, and/or a processor bus or a local bus using any of various bus architectures. The gesture control device 500 may also include control lines, data lines or the like.

Although specific functions are discussed above with reference to specific modules, it should be noted that the functions of each module discussed herein may also be divided into multiple modules, and/or at least some functions of multiple modules may be combined into a single module. In addition, the specific module that performs an action discussed herein includes the specific module itself performing the action, or alternatively, the specific module calls or otherwise accesses another component or module that performs the action (or performs the action in combination with the specific module). Therefore, a specific module that performs an action includes the specific module itself performing the action and/or another module that the specific module calls or otherwise accesses to performs the action.

Figure 9:
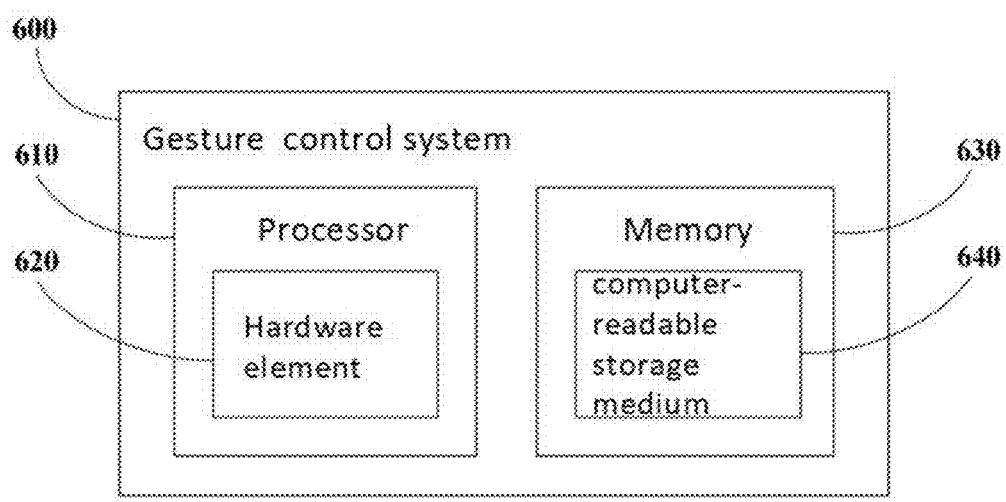
FIG. 9 is a schematic structural block diagram of a gesture control system according to an exemplary embodiment of the present disclosure.

Refer to FIG. 9, it shows a schematic structural block diagram of a gesture control system 600 according to an exemplary embodiment of the present disclosure. The gesture control system 600 includes a processor 610 and a memory 630.

The processor 610 is illustrated as including a hardware element 620 that can be configured as a processing unit, a functional block, or the like. This may include it is implemented in hardware as an application specific integrated circuit (ASIC) or other logic devices formed with one or more semiconductors. The hardware element 620 is not intended to be limited by the material it is formed of or the processing mechanism adopted therein. For example, the processor 610 may comprise semiconductor(s) and/or transistors (e.g., electronic integrated circuits (ICs)). The processor 610 may include a single processing unit or multiple processing units, and all processing units may include a single or multiple computing units or cores. The processor 610 may be implemented as one or more of microprocessors, microcomputers, microcontrollers, digital signal processors, central processing units, state machines, logic circuits, and/or any devices that manipulate signals based on operating instructions. Among other capabilities, the processor 610 may be configured to obtain and execute executable instructions stored in the memory 630 to execute the first, second, third, or fourth gesture control method 100, 200, 300, or 300′ described above.

The memory 630 is illustrated as including a computer-readable storage medium 640 that can be configured to store executable instructions which, when executed by the processor 610, can implement the first, second, third or fourth gesture control method 100, 200, 300 or 300′ as described above. The computer-readable storage medium 640 may include volatile or nonvolatile, removable or non-removable, media implemented by any method or technology for storing information, such as computer-readable executable instructions, data, etc. The computer-readable storage medium 640 may include, but is not limited to, RAM, ROM, EEPROM, flash memory or other storage technologies, CD-ROM, digital versatile disk (DVD), or other optical storage devices, magnetic cassettes, magnetic tapes, magnetic disk storage devices, or other magnetic storage device, or any other storage medium that can be used to store information.

Similarly, the gesture control system 600 may also include a system bus or other data and command transmission systems to connect the processor 610 and the memory 630 to each other. The system bus may include any or combination of various bus structures, such as a memory bus or a memory controller, a peripheral bus, a universal serial bus, and/or a processor bus or a local bus using any of various bus architectures. In addition, the gesture control system 600 may also include control line, data lines, or the like.

The aforementioned gesture control methods, gesture control devices, and gesture control systems can cooperate with any suitable electronic equipment, including but not limited to, television sets, monitors, projectors, screens, computers, tablets, entertainment equipment (for example, entertainment appliances, top-set boxes communicatively coupled to display devices, game consoles) etc., to control the operations of these electronic devices. The operations of the aforementioned gesture control methods, gesture control devices, and gesture control systems on electronic devices can be performed based on instructions mapped from recognized gestures or gesture instructions of tracked gesture. The instruction mapping may be based on the form of the gesture, or may be based on the form of the gesture in combination with the trajectory information of the gesture. As an exemplary embodiment of the present disclosure, the following table lists gesture instructions that can be used to operate media resource display devices such as picture screens. The gesture instructions are based on the forms of the gestures and in combination with trajectory information of the gestures, to realize various operations of the media resource display device. It is easy to understand that the media resource display device can also be any other suitable display device, such as, but not limited to, a display, a projector, a TV set, and so on.

TABLE 1

Gesture instructions for operate a Picture Screen

| Type of image acquisition device | Mode | Instructions | Operations |
|---|---|---|---|
| Common camera | Picture operation mode | Page left | Palm facing the camera, and moving to left by 15 cm |
| | | Page right | Palm facing the camera, and moving to right by 15 cm |
| | Mouse-simulation mode | Move mouse | Palm facing the camera, and moving in any direction, so as to drag the indicator in the screen |
| | | Click | Palm turning into fist, making a grasp action |
| depth-of-field camera | Picture operation mode | Page left | Palm facing the camera, and moving to left by 15 cm |
| | | Page right | Palm facing the camera, and moving to right by 15 cm |
| | | Zoom in | Opening both hands with palms facing the camera |
| | | Drag after zoom in to change focus | After the picture is zoomed in, turning one hand into fist and move it in any direction |
| | | Zoom out | Both palms facing the camera and then both hands turning into fists |

It should be understood that the gesture instructions listed in the above table are only exemplary and not for limiting. For example, for the gesture instructions for page-turning operations as listed in the table above, the form of the recognized one-hand gesture can be any of the following forms: a palm with fingers stick together, or a palm with fingers spread out, or even a fist. The one-hand gesture can move in other directions, such as but not limited to, to upper left or to lower left. The moving distance can also be any other suitable distance according to actual needs, such as but not limited to, 10 cm or 20 cm. Similarly, for the gesture instructions for moving the mouse as listed in the table above, the form of the gesture can be a form of a palm with fingers stick together, or a form of a palm with the fingers spread out, or even a form of a fist; it can be selected based on actual needs. For the gesture instructions listed in the above table for implementing zoom-in display and zoom-out display operations, the two-hand gestures may have different forms from those listed in the above table. In addition, for the gesture instruction for click listed in the above table, it can work as long as the form of the detected gesture changes from one form to another different form.

Figure 10:
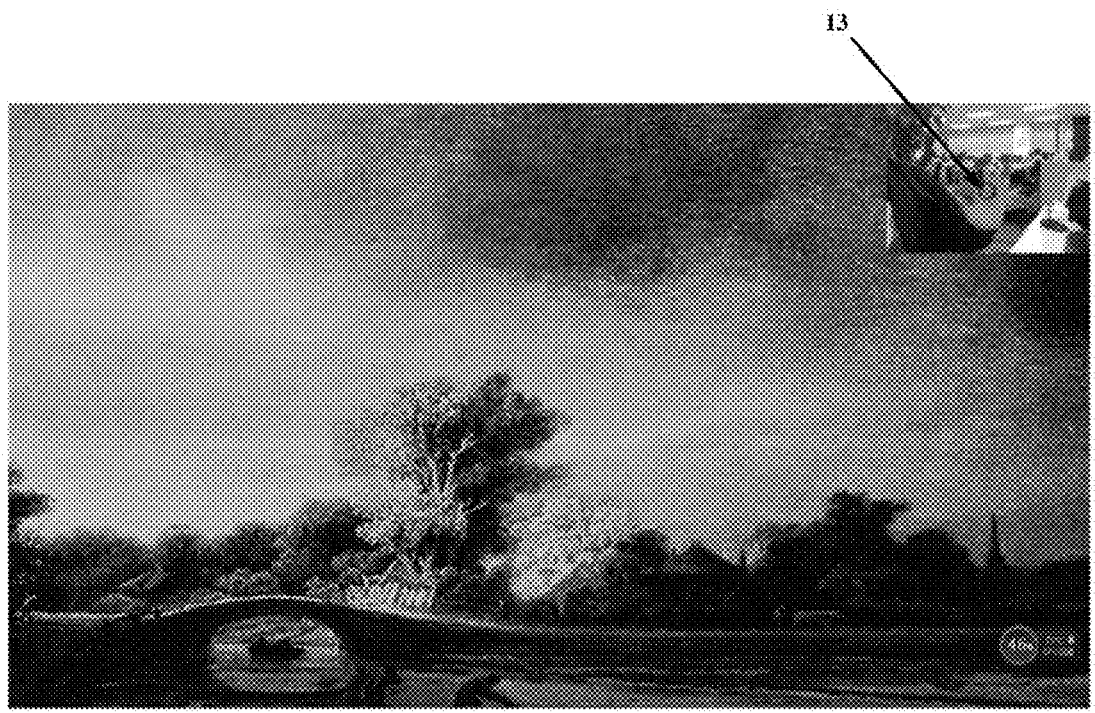
FIG. 10 schematically shows that recognition result of a one-hand gesture is displayed on a display interface of a media resource display device.

Referring to FIG. 10, it schematically shows that gesture recognition result is displayed on a display interface of a media resource display device, which may be, for example, the above-mentioned Picture Screen. As shown in FIG. 10, the gesture recognition result can be displayed in the upper right corner of the display interface of the media resource display device, which helps feedback the user with his/her action's effect and can be used to restrict the user's range of standing positions. It is to be readily understood that the recognition result of the gesture can be displayed at any suitable position of the display interface, such as the lower right corner, upper left corner, or lower left corner of the display interface. The one-hand gesture recognized in FIG. 10 is user's palm with fingers stick together. When this gesture is recognized, a first identifier 13 may be marked on the gesture to prompt the user of successful recognition. In FIG. 10, the first identifier 13 is a blue circle. However, it is to be readily understood that the first identifier 13 can adopt any other suitable color and shape.

Figure 11:
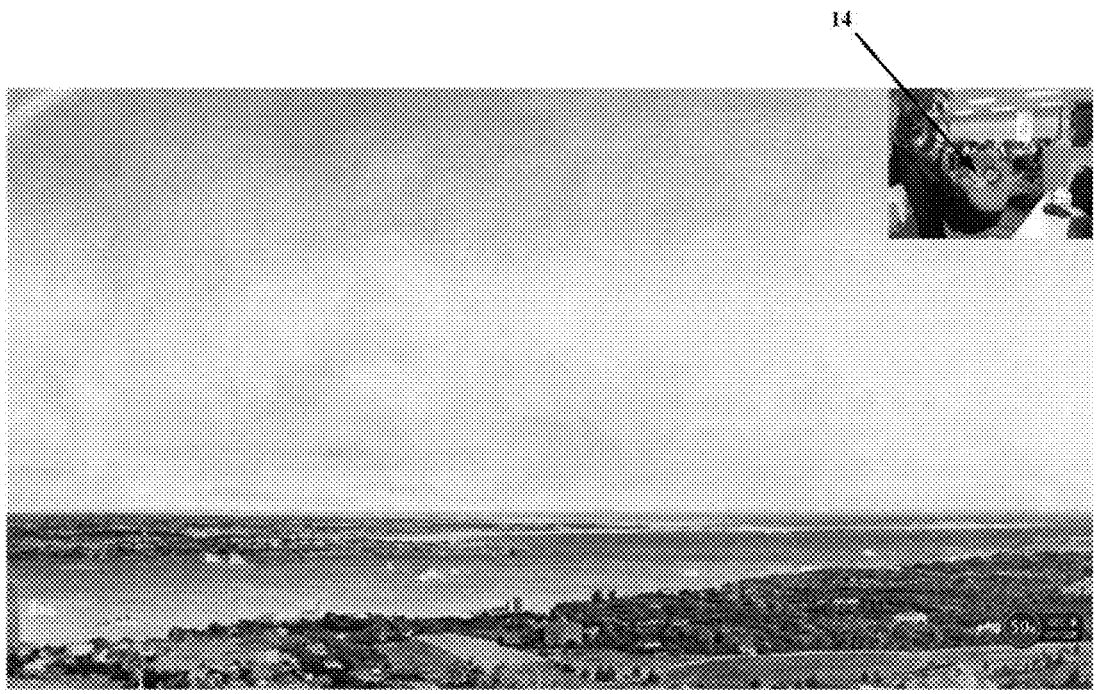
FIG. 11 schematically shows that trajectory information of the recognized one-hand gesture is displayed on the display interface shown in FIG. 10.

Refer to FIG. 11, it shows that trajectory information of the recognized one-hand gesture is displayed on the display interface shown in FIG. 10. As shown in FIG. 11, when the gesture is successfully recognized, the user moves the palm, and at this time, the movement trajectory of the gesture is detected, and a second identifier 14 can be added accordingly to prompt the user of the trajectory of the palm movement. In FIG. 11, the second identifier 14 is a light blue circle; however, it is to be understood that the second identifier 14 can adopt any other suitable color and shape. The case shown in FIG. 11 cooperating with the situation shown in FIG. 10 can realize the page-turning gesture instructions described in Table 1.

Figure 12:
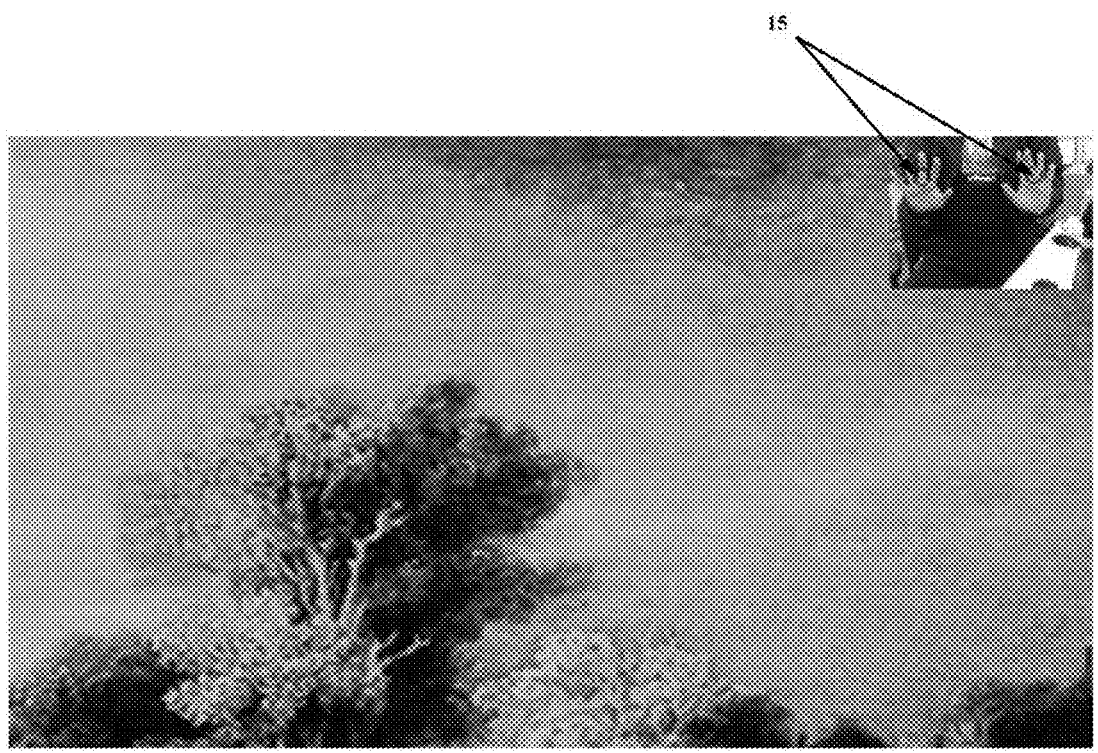
FIG. 12 schematically shows that recognition result of a two-hand gesture is displayed on the display interface shown in FIG. 10.
Figure 13:
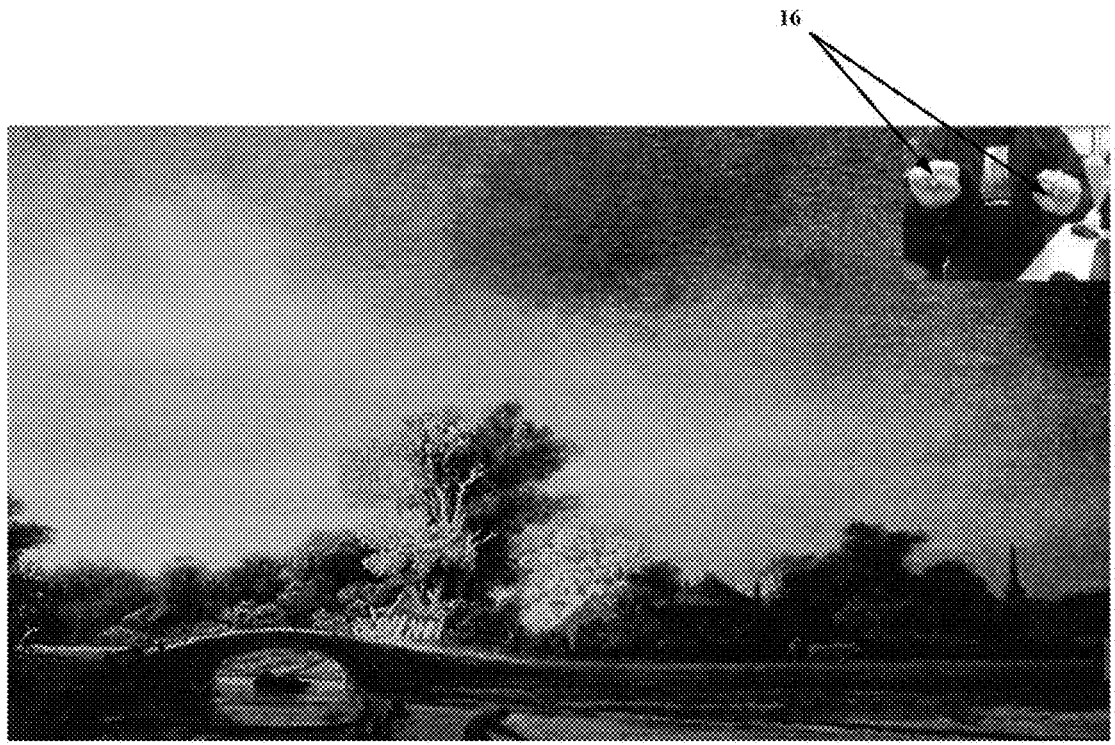
FIG. 13 schematically shows that recognition result of a two-hand gesture is displayed on the display interface shown in FIG. 10.

Refer to FIG. 12, it schematically shows that the recognition result of the two-hand gesture is displayed in the display interface shown in FIG. 10. As shown in FIG. 12, the two-hand gesture recognized here is user's both hands opened at the same time. At this time, a third identifier 15 can be added to the gesture of two-hand open in the display interface. Based on the two-hand gesture shown in FIG. 12, the zoom-in gesture instruction described in Table 1 can be realized. FIG. 13 schematically shows that a recognition result of another two-hand gesture is displayed on the display interface shown in FIG. 10. As shown in FIG. 13, the two-hand gesture recognized here is user's both hands fisting at the same time. At this time, a fourth identifier 16 can be added to the two-hand gesture of fists in the display interface. Based on the two-hand gesture shown in FIG. 13, the zoom-out display gesture instruction described in Table 1 can be realized. The third identifier 15 is two blue circles, and the fourth identifier 16 is two green dots. However, it is to be understood that the third identifier 15 and the fourth identifier 16 can adopt any other suitable colors and shapes.

Figure 14:
FIG. 14 schematically shows that recognition result of a one-hand gesture is displayed on the display interface shown in FIG. 10.

FIG. 14 schematically shows that a recognition result of another one-hand gesture is displayed on the display interface shown in FIG. 10. As shown in FIG. 14, the one-hand gesture recognized here is user's one hand making a fist. At this time, a fifth identifier 17 can be added to the one-hand gesture of first in the display interface. If the content displayed on the display interface of the media resource display device is already zoomed in, based on the one-hand gesture shown in FIG. 14, the drag-after-zoom-in gesture instruction described in Table 1 can be realized; however, when the displayed content is not in a zoomed-in state, the one-hand gesture shown in FIG. 14 may not trigger any instruction.

The above contents are only the descriptions and illustrations of the exemplary embodiments of the present disclosure, and such descriptions and illustrations shall be regarded as illustrative and exemplary, and the scope of the present disclosure shall not be limited thereto. Various changes or substitutions are obvious for those skilled in the art under the teaching of the present disclosure, and these changes and substitutions are intended to be embraced within the scope of the present disclosure. Therefore, the scopes of the inventions to be claimed should only be defined by the appended claims.

What is claimed is:
1. A gesture control method, comprising:
acquiring a first image;
performing a first gesture detection on the first image to recognize a first gesture from the first image, the first gesture is an one-hand gesture;

setting the recognized first gesture as a comparative gesture;
acquiring a second image;
performing a second gesture detection on the second image;
determining, no gesture is recognized from the second image;
determining a time interval from the first gesture detection, in which the first gesture is recognized, to the second gesture detection is less than a preset time period;
tracking gesture in the second image based on the comparative gesture; and
updating the comparative gesture with the tracked gesture.

2. The gesture control method according to claim 1,
wherein performing the first gesture detection on the first image comprises:
  performing a motion detection on the first image to determine a first focus area in the first image;
  performing a gesture detection on the first image based on the first focus area to recognize the first gesture; and
  setting the first focus area as a focus area;
wherein performing the second gesture detection on the second image comprises:
  performing a motion detection on the second image to determine a second focus area in the second image;
  performing a gesture detection on the second image based on the focus area,
the gesture control method further comprising:
updating the focus area with the determined second focus area;
acquiring a third image; and
performing a third gesture detection on the third image based on the updated focus area.

3. A gesture control method, comprising:
identifying an image acquisition device for acquiring image, to determine the image acquisition device is nota depth-of-field image acquisition device;
conducting the gesture control method according to claim 2.

4. The gesture control method according to claim 3, wherein:
the gesture control method is used to control operation of a media resource display device to implement at least one of the following gesture instructions:
  in the case where it is detected that an movement distance of an one-hand gesture in a first form along a first direction is greater than a preset distance, generating a first gesture instructions for turning page in a first direction;
  in the case where it is detected that a one-hand gesture in the first form moves in any direction, generating a second gesture instruction for controlling a first identifier in an display interface of the media resource display device to move in a corresponding direction; and
  in the case where it is detected that an one-hand gesture changes from a second form to a third form which is different from the second form, generating a click operation instruction.

5. The gesture control method according to claim 4 further comprising:
displaying result information of the gesture detection on the display interface of the media resource display device.

6. The gesture control method according to claim 5, wherein displaying the result information of the gesture detection on the display interface comprises at least one of the following:
  when a gesture is recognized, displaying a second identifier on the display interface; and
  when a gesture movement is recognized, moving the second identifier along a direction of the gesture movement.

7. The gesture control method according to claim 1:
wherein performing the first gesture detection on the first image comprises:
  performing a motion detection on the first image to determine a first focus area in the first image;
  performing a gesture detection on the first image based on the first focus area to recognize the first gesture; and
  setting the first focus area as a focus area;
wherein performing the second gesture detection on the second image comprises:
  performing a motion detection on the second image to determine a second focus area in the second image;
  performing a gesture detection on the second image based on the focus area,
the gesture control method further comprising:
  updating the focus area based on the tracked gesture.

8. The gesture control method according to claim 1, wherein:
acquiring the second image comprises:
  acquiring a depth image corresponding to the second image;
performing the second gesture detection on the second image comprises:
  determining a foreground connected component of the second image based on the depth image;
  determining a detection area in the second image based on the foreground connected component; and
  performing a gesture detection on the second image based on the detection area.

9. A gesture control method, comprising:
identifying an image acquisition device for acquiring image, to determine the image acquisition device is a depth-of-field image acquisition device; and
conducting the gesture control method according to claim 8.

10. The gesture control method according to claim 9, wherein:
the gesture control method is used to control operation of an media resource display device to implement at least one of the following gesture instructions:
  in the case where it is detected that an movement distance of a one-hand gesture in a first form along a first direction is greater than a preset distance, generating a first gesture instruction for turning page in a first direction;
  in the case where it is detected that gestures of both hands are in a second form, generating a third gesture instruction for zooming in a content displayed on a display interface of the media resource display device;
  in the case where it is detected that gestures of both hands are in a third form that is different from the second form, generating a fourth gesture instruction for zooming out a content displayed on the display interface of the media resource display device;
  in the case where a content displayed on the display interface of the media resource display device is already in a zoomed-in manner, if it is detected that a one-hand gesture in the third form moves in any direction, generating a fifth gesture instruction for controlling a zoomed-in content on the display interface of the media resource display device to be moved in a corresponding direction.

11. The gesture control method according to claim 1, further comprising:

determining a second gesture is recognized from the second image; and selectively updating the comparative gesture based on the recognized second gesture.

12. The gesture control method according to claim 11, further comprising:

generating a gesture instruction based on a result of the second gesture detection, wherein the result of the gesture detection includes a form of the second gesture and trajectory information of the second gesture.

13. The gesture control method according to claim 12, further comprising:

generating a gesture instruction based on the tracked gesture, including:

generating the gesture instruction based on a form of the tracked gesture and trajectory information of the traced gesture, and wherein the preset time period is selected from a range from 0.5 seconds to 1 second.

14. The gesture control method according to claim 11, wherein selectively updating the comparative gesture based on the recognized second gesture comprising any one of:

updating the comparative gesture with the second gesture in the case that the second gesture is an one-hand gesture; or skipping updating of the comparative gesture in the case that the second gesture is a two-hand gesture.

15. A gesture control device, comprising:

a processor; and a memory for storing computer-executable instructions which when executed by the processor cause the processor to perform the method according to claim 1.

16. A non-transitory computer-readable storage medium that stores executable instructions therein, wherein when the executable instructions are executed by a processor, the processor is caused to perform the gesture control method according to claim 1.

* * * * *